(12) United States Patent
Shao et al.

(10) Patent No.: US 12,388,750 B2
(45) Date of Patent: Aug. 12, 2025

(54) METHOD, SYSTEM AND APPARATUS FOR FORWARDING DATA IN VIRTUAL NETWORK AND PROGRAM PRODUCT

(71) Applicant: Beijing Baidu Netcom Science Technology Co., Ltd., Beijing (CN)

(72) Inventors: Yong Shao, Beijing (CN); Zhongshan Liu, Beijing (CN); Bing Huang, Beijing (CN); Peilong Wang, Beijing (CN); Yao Wang, Beijing (CN); Yan Wang, Beijing (CN); Fenghui Zhang, Beijing (CN); Qingzhi Zhou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 322 days.

(21) Appl. No.: 18/082,348

(22) Filed: Dec. 15, 2022

(65) Prior Publication Data

US 2023/0131871 A1  Apr. 27, 2023

(30) Foreign Application Priority Data

Jun. 17, 2022  (CN) .......................... 202210693291.1

(51) Int. Cl.
  *G06N 5/025* (2023.01)
  *H04L 45/586* (2022.01)
  *H04L 45/76* (2022.01)

(52) U.S. Cl.
  CPC ............. *H04L 45/76* (2022.05); *G06N 5/025* (2013.01); *H04L 45/586* (2013.01)

(58) Field of Classification Search
  CPC ....... G06N 5/025; H04L 45/586; H04L 45/72; H04L 45/745; H04L 45/76; H04L 49/109;

(Continued)

(56) References Cited

U.S. PATENT DOCUMENTS 9,525,613 B2 *  12/2016  Akiyoshi ............ H04L 12/4641
10,142,226 B1  11/2018  Wu et al.
(Continued)

FOREIGN PATENT DOCUMENTS

CN  102055667 A  5/2011
CN  103023704 A  4/2013
(Continued)

OTHER PUBLICATIONS

Tong, Li et al., "Label-based POF network virtualization," Institute of Information Engineering, Chinese Academy of Sciences, Beijing, China 100093; Application Research of Computers, vol. 35, No. 2, pp. 1-8 (Feb. 2018).

(Continued)

*Primary Examiner* — Alpus Hsu
(74) *Attorney, Agent, or Firm* — Kilpatrick Townsend & Stockton LLP

(57) ABSTRACT

A method, system and apparatus for forwarding data in a virtual network, an electronic device, a storage medium and a computer program product are provided. The method includes: determining, in a process of managing virtual private cloud networks through a central control node, all forwarding rules for nodes in the virtual private cloud networks; synchronizing the forwarding rules in a virtual routing cluster, and determining target forwarding rules corresponding to each virtual private cloud network from the forwarding rules; and through a virtual switch in each virtual private cloud network, learning the target forwarding rules corresponding to the virtual private cloud network to which the virtual switch belongs, and performing data forwarding based on the learned target forwarding rules.

20 Claims, 10 Drawing Sheets

(58) Field of Classification Search
CPC .. H04L 49/252; H04L 49/3009; H04L 49/557
See application file for complete search history.

(56) References Cited

U.S. PATENT DOCUMENTS

| | | | |
|---|---|---|---|
| 10,447,603 B2* | 10/2019 | Ni | H04L 45/645 |
| 10,680,930 B2* | 6/2020 | Yang | H04L 45/28 |
| 2011/0103259 A1 | 5/2011 | Aybay et al. | |
| 2015/0249587 A1* | 9/2015 | Kozat | H04L 43/20 |
| | | | 370/236 |
| 2016/0269325 A1 | 9/2016 | Zhou | |
| 2018/0167287 A1 | 6/2018 | Lim | |
| 2018/0302243 A1* | 10/2018 | Li | H04L 65/1013 |
| 2019/0103993 A1* | 4/2019 | Cidon | H04L 61/4511 |
| 2019/0238508 A1 | 8/2019 | Hira et al. | |
| 2020/0028762 A1* | 1/2020 | Sun | H04L 41/12 |
| 2021/0203619 A1* | 7/2021 | Lin | H04L 49/252 |
| 2022/0086092 A1* | 3/2022 | Li | H04L 47/125 |

FOREIGN PATENT DOCUMENTS

| | | |
|---|---|---|
| CN | 105049450 A | 11/2015 |
| CN | 109861839 A | 6/2019 |
| CN | 110149231 A | 8/2019 |
| CN | 112866410 A | 5/2021 |
| WO | 2022/092238 A1 | 5/2022 |

OTHER PUBLICATIONS

Chen, Jui-Fa et al., "A forwarding model for Voronoi-based Overlay Network," Department of Computer Science and Information Engineering, TamKang University, Danshui, Taiwan 25137, R.O.C.; Takming University of Science and Technology; IEEE, pp. 1-7 (2007).

Shaoguang, Yang et al., "Research on SDN-based Virtual Private Cloud," China Unicom Research Institute, Beijing, China 100032; Business & Operation, pp. 6-11.

* cited by examiner

METHOD, SYSTEM AND APPARATUS FOR FORWARDING DATA IN VIRTUAL NETWORK AND PROGRAM PRODUCT

CROSS-REFERENCE TO RELATED APPLICATIONS

The present application claims the priority of Chinese Patent Application No. 202210693291.1, titled "METHOD, SYSTEM AND APPARATUS FOR FORWARDING DATA IN VIRTUAL NETWORK AND PROGRAM PRODUCT", filed on Jun. 17, 2022, the content of which is incorporated herein by reference in its entirety.

TECHNICAL FIELD

The present disclosure relates to the field of artificial intelligence technology, in particular to cloud computing and cloud network technologies, and more particularly, to a method, system, and apparatus for forwarding data in a virtual network, an electronic device, a storage medium, and a computer program product, which may be used in intelligent cloud scenarios.

BACKGROUND

At present, cloud networks are growing stronger and better. In terms of forwarding table management and memory usage, it is necessary to meet requirements of hundreds of thousands of virtual machines and millions of Internet Protocol addresses for a single large customer, as well as millions of virtual machines and millions of Internet Protocol addresses for an entire cluster. As such, it brings great difficulty for a central control node to manage forwarding entries, and it is difficult to synchronize a change in forwarding rules in the entire network cluster in a short time, which brings an extremely unfriendly experience to customers.

SUMMARY

The present disclosure provides a method, system and apparatus for forwarding data in a virtual network, an electronic device, a storage medium and a computer program product.

Some embodiments of the present disclosure provide a method for forwarding data in a virtual network, including: determining, in a process of managing virtual private cloud networks through a central control node, all forwarding rules for nodes in the virtual private cloud networks; synchronizing the forwarding rules in a virtual routing cluster, and determining target forwarding rules corresponding to each virtual private cloud network from the forwarding rules; and through a virtual switch in each virtual private cloud network, learning the target forwarding rules corresponding to the virtual private cloud network to which the virtual switch belongs, and performing data forwarding based on the learned target forwarding rules.

Some embodiments of the present disclosure provide a system for forwarding data in a virtual network, including: a central control node, configured to determine, in a process of managing virtual private cloud networks, all forwarding rules for nodes in the virtual private cloud networks; a virtual routing cluster, configured to synchronize the forwarding rules, and determine target forwarding rules corresponding to each virtual private cloud network from the forwarding rules; and a plurality of virtual private cloud networks, configured to, through a virtual switch in each virtual private cloud network, learn the target forwarding rules corresponding to the virtual private cloud network to which the virtual switch belongs, and perform data forwarding based on the learned target forwarding rules.

Some embodiments of the present disclosure provide an apparatus for forwarding data in a virtual network, including: a first determining unit, configured to determine, in a process of managing virtual private cloud networks through a central control node, all forwarding rules for nodes in the virtual private cloud networks; a second determining unit, configured to synchronize the forwarding rules in a virtual routing cluster, and determine target forwarding rules corresponding to each virtual private cloud network from the forwarding rules; and a learning and forwarding unit, configured to, through a virtual switch in each virtual private cloud network, learn the target forwarding rules corresponding to the virtual private cloud network to which the virtual switch belongs, and perform data forwarding based on the learned target forwarding rules.

It should be understood that the content described in this section is not intended to identify key features or embodiments of the present disclosure, nor is it intended to limit the scope of the present disclosure. Other features of the present disclosure will become readily understood from the following description.

BRIEF DESCRIPTION OF THE DRAWINGS

The accompanying drawings are used for better understanding of the present solution, and do not constitute a limitation to the present disclosure.

DETAILED DESCRIPTION OF EMBODIMENTS

Exemplary embodiments of the present disclosure are described below with reference to the accompanying drawings, where various details of the embodiments of the present disclosure are included to facilitate understanding, and should be considered merely as exemplary. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

In the technical solution of the present disclosure, the collection, storage, use, processing, transmission, provision and disclosure of the user personal information involved are all in compliance with relevant laws and regulations, and do not violate public order and good customs.

Figure 1:
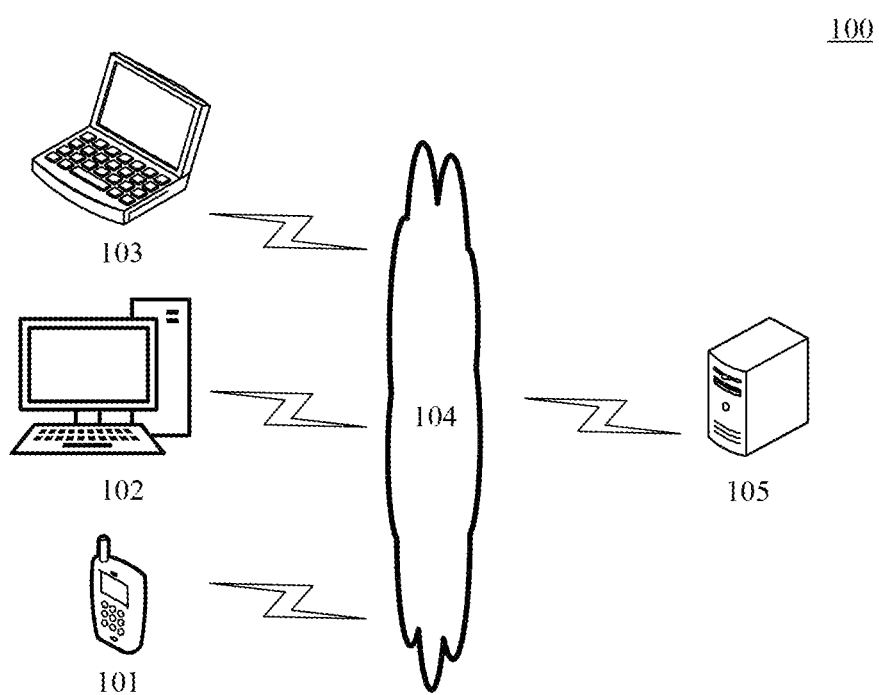
FIG. 1 is an exemplary system architecture diagram to which an embodiment of the present disclosure may be applied.

FIG. 1 shows an exemplary system architecture 100 to which a method and apparatus for forwarding data in a virtual network of the present disclosure may be applied.

As shown in FIG. 1, the system architecture 100 may include terminal devices 101, 102, and 103, a network 104, and a server 105. The terminal devices 101, 102 and 103 are communicatively connected with each other to form a topological network. The network 104 serves as a medium providing a communication link between the terminal devices 101, 102, 103, and the server 105. The network 104 may include various types of connections, such as wired or wireless communication links, or optical cables.

The terminal devices 101, 102, 103 interact with the server 105 through the network 104 to receive or send messages, etc. The terminal devices 101, 102, 103 may be hardware devices or software that support network connection for data interaction and data processing. When the terminal devices 101, 102 and 103 are hardware, they may be various electronic devices that support functions such as network connection, information acquisition, interaction, display, processing, including but not limited to vehicle-mounted computers, smartphones, tablet computers, e-book readers, laptops computers, desktop computers, or the like. When the terminal devices 101, 102, and 103 are software, they may be installed in the above listed electronic devices. The terminal devices 101, 102, and 103 may be implemented as, for example, a plurality of software or software modules used to provide distributed services, or as a single software or software module, which is not limited herein.

The server 105 may be a server that provides virtual network services. For example, it may be a backend processing server, in which, by a central control node, virtual private cloud networks are managed, and all forwarding rules among nodes in the virtual private cloud networks are determined; by a virtual routing cluster, all the forwarding rules are synchronized, and target forwarding rules corresponding to each virtual private cloud network are determined from all the forwarding rules, so that a virtual switch in the virtual private cloud network learns corresponding forwarding rules, and forwards access data transmitted by the terminal devices 101, 102, and 103. As an example, the server 105 may be a cloud server.

It should be noted that the server may be hardware or software. When the server is hardware, it may be implemented as a distributed server cluster composed of a plurality of servers, or may be implemented as a single server. When the server is software, it may be implemented as a plurality of software or software modules (for example, software or software modules used to provide distributed services), or may be implemented as a single software or software module, which is not limited herein.

It should also be noted that the method for forwarding data in a virtual network provided by the embodiments of the present disclosure may be performed by the server, the terminal devices, or the server and the terminal devices in cooperation with each other. Correspondingly, parts (e.g., units) included in the apparatus for forwarding data in a virtual network may be all provided in the server, or all provided in the terminal devices, or may be provided in the server and the terminal devices respectively.

It should be understood that the numbers of terminal devices, networks, and servers in FIG. 1 are merely illustrative. Any number of terminal devices, networks, and servers may be provided according to implementation needs. When an electronic device on which the method for forwarding data in a virtual network runs does not need to perform data transmission with other electronic devices, this system architecture may only include the electronic device (such as the server or the terminal device) on which the method for forwarding data in a virtual network runs.

Figure 2:
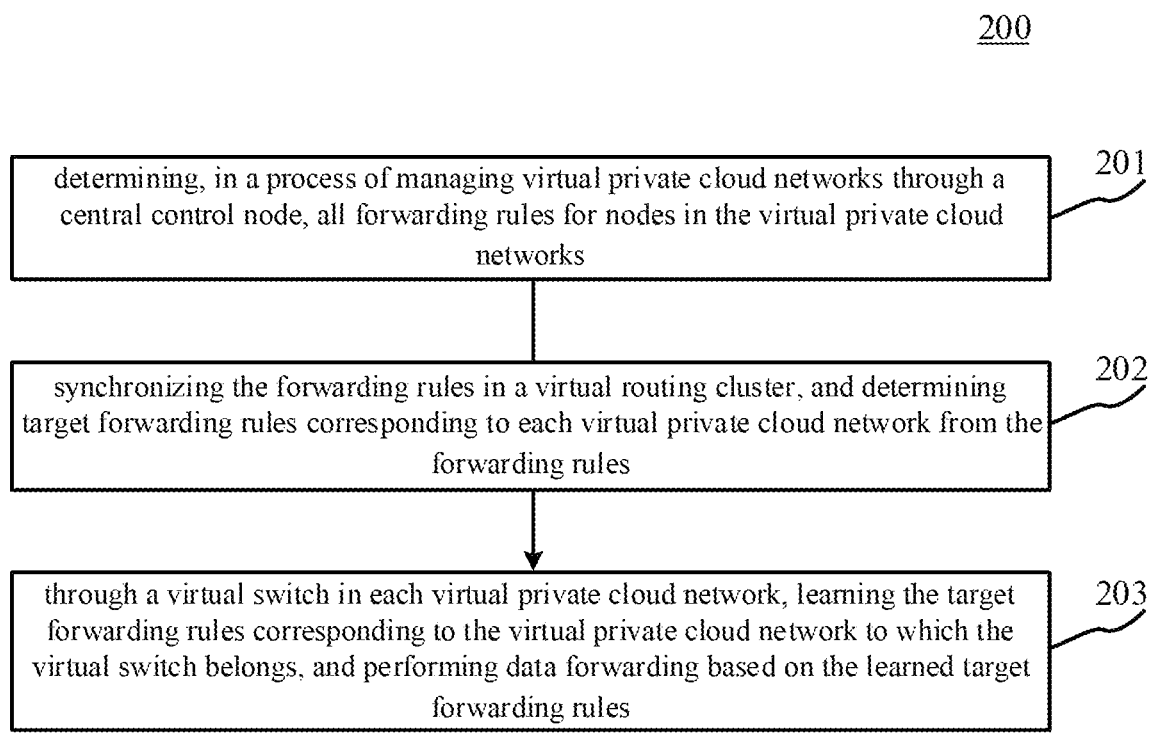
FIG. 2 is a flowchart of an embodiment of a method for forwarding data in a virtual network according to the present disclosure.

With reference to FIG. 2, FIG. 2 is a flowchart of a method for forwarding data in a virtual network provided by an embodiment of the present disclosure, where a flow 200 includes the following step 201 to step 203.

Step 201, determining, in a process of managing virtual private cloud networks through a central control node, all forwarding rules for nodes in the virtual private cloud networks.

In the present embodiment, an executing body (for example, the terminal device or the server in FIG. 1) of the method for forwarding data in a virtual network may determine all the forwarding rules for the nodes in the virtual private cloud networks, in the process of managing the virtual private cloud networks through the central control node.

In the present embodiment, a virtual network is, for example, an Overlay network constructed on an Underlay network. An Underlay network is a bearer network that is composed of various kinds of physical devices and in which IP connectivity among the physical devices is ensured by using a routing protocol. An Overlay network is one or a plurality of virtual logical networks constructed on the same Underlay network through a network virtualization technology. Although different Overlay networks share devices and lines in the Underlay network, services in the Overlay networks are decoupled from physical networking and interconnection technologies in the Underlay network.

As an example, in a virtual network, VPC (Virtual Private Cloud) network services may be provided for each tenant. A VPC network is an isolated and private virtual network environment built with resources on the cloud such as cloud servers, cloud containers, and cloud databases. In the VPC, tenants may flexibly manage networks on the cloud, including creating a subnet, setting a security group and a network ACL (Access Control List), managing a routing table, applying for an elastic IP and bandwidth, or the like.

A virtual private cloud network may include a plurality of computing nodes, and a virtual machine and a corresponding virtual switch are provided in a computing node. Access between a source node and a target node may be realized through a corresponding forwarding rule. As an example, the forwarding rule includes an IP address and an MAC address of the source node, an IP address and an MAC address of the target node, and a VTEP (VXLAN (Virtual Extensible Local Area Network) Tunnel EndPoint) between the source node and the target node.

The central control node is responsible for operations such as creating, deleting, migrating, or IP (Internet Protocol) address assigning and binding of the virtual machines in the virtual private cloud networks, and adjusting a forwarding rule that changes in a management process and corresponds to a virtual machine, so as to determine all the forwarding rules, each being between two computer nodes of the computing nodes in all the virtual private cloud networks. Specifically, a forwarding flow table may be used to record the forwarding rules for the computing nodes in the virtual private cloud networks.

Step 202, synchronizing the forwarding rules in a virtual routing cluster, and determining target forwarding rules corresponding to each virtual private cloud network from the forwarding rules.

In the present embodiment, the executing body may synchronize all the forwarding rules in the virtual routing cluster, and determine the target forwarding rules corresponding to each virtual private cloud network from all the forwarding rules.

In the present embodiment, the center control node does not need to manage the forwarding flow table of the computing nodes, but only needs to deliver the forwarding flow table to the virtual routing cluster. The virtual routing cluster consists of multiple virtual routers. The virtual routers in the virtual routing cluster may be of the same structure, or they may be devices with different structures, such as X86 servers and FPGAs (Field Programmable Gate Arrays).

As an example, the virtual routing cluster may send a forwarding rule synchronization request to the center control node in real time, and the central control node may send an unsynchronized forwarding rule that has not been synchronized in the virtual routing cluster to the virtual routing cluster to perform forwarding rule synchronization. The unsynchronized forwarding rule may be, for example, a forwarding rule that have not been synchronized in the virtual routing cluster in an initial synchronization process, or a forwarding rule updated by the center control node because of an executing operation such as creating, deleting, migrating, or IP address assigning and binding of a virtual machine in a virtual private cloud network.

As another example, the central control node may actively send the unsynchronized forwarding rule to the virtual routing cluster in real time to perform the forwarding rule synchronization.

The target forwarding rules corresponding to a virtual private cloud network indicate forwarding rules for the computing nodes in the virtual private cloud network. A virtual network generally includes multiple virtual private cloud networks, and the virtual routing cluster may determine the target forwarding rules corresponding to each virtual private cloud network from all the forwarding rules. For example, for each virtual private cloud network, the center control node may set a unique identifier, and set corresponding identifiers on the forwarding rules corresponding to the virtual private cloud network. Then, the virtual routing cluster may determine the target forwarding rules corresponding to each virtual private cloud network according to the identifier of the virtual private cloud network.

After determining the target forwarding rules corresponding to each virtual private cloud network, the virtual routing cluster may arrange the forwarding rules in order and merge forwarding rules corresponding to the same IP.

Step 203, through a virtual switch in each virtual private cloud network, learning the target forwarding rules corresponding to the virtual private cloud network to which the virtual switch belongs, and performing data forwarding based on the learned target forwarding rules.

In the present embodiment, the executing body may, through each virtual switch in the virtual private cloud networks, learn the target forwarding rules corresponding to the virtual private cloud network to which the virtual switch belongs and perform data forwarding based on the learned target forwarding rules.

As an example, for the virtual switch in each virtual private cloud network, the target forwarding rules corresponding to the virtual private cloud network to which the virtual switch belongs may be learned through the virtual switch. Specifically, in an initial stage, current target forwarding rules corresponding to the virtual private cloud network to which the virtual switch belongs are synchronized at one time in the virtual switch; and in a subsequent stage, an updated target forwarding rule for the virtual private cloud network to which the virtual switch belongs is synchronized in real time. If a target forwarding rule has been stored in the virtual switch, it indicates that this target forwarding rule has been synchronized in and learned by the virtual switch.

After learning the target forwarding rules, if the virtual switch receives access data from a source node, it may determine a forwarding rule corresponding to the access data, so as to forward the access data to a corresponding target node according to the determined forwarding rule. For example, based on the access data, an IP address of a corresponding source node and an IP address of a corresponding target node may be determined, and a MAC address corresponding to the IP address of the target node, as well as the VTEP between the source node and the target node may be further determined, so as to determine the corresponding forwarding rule.

Figure 3:
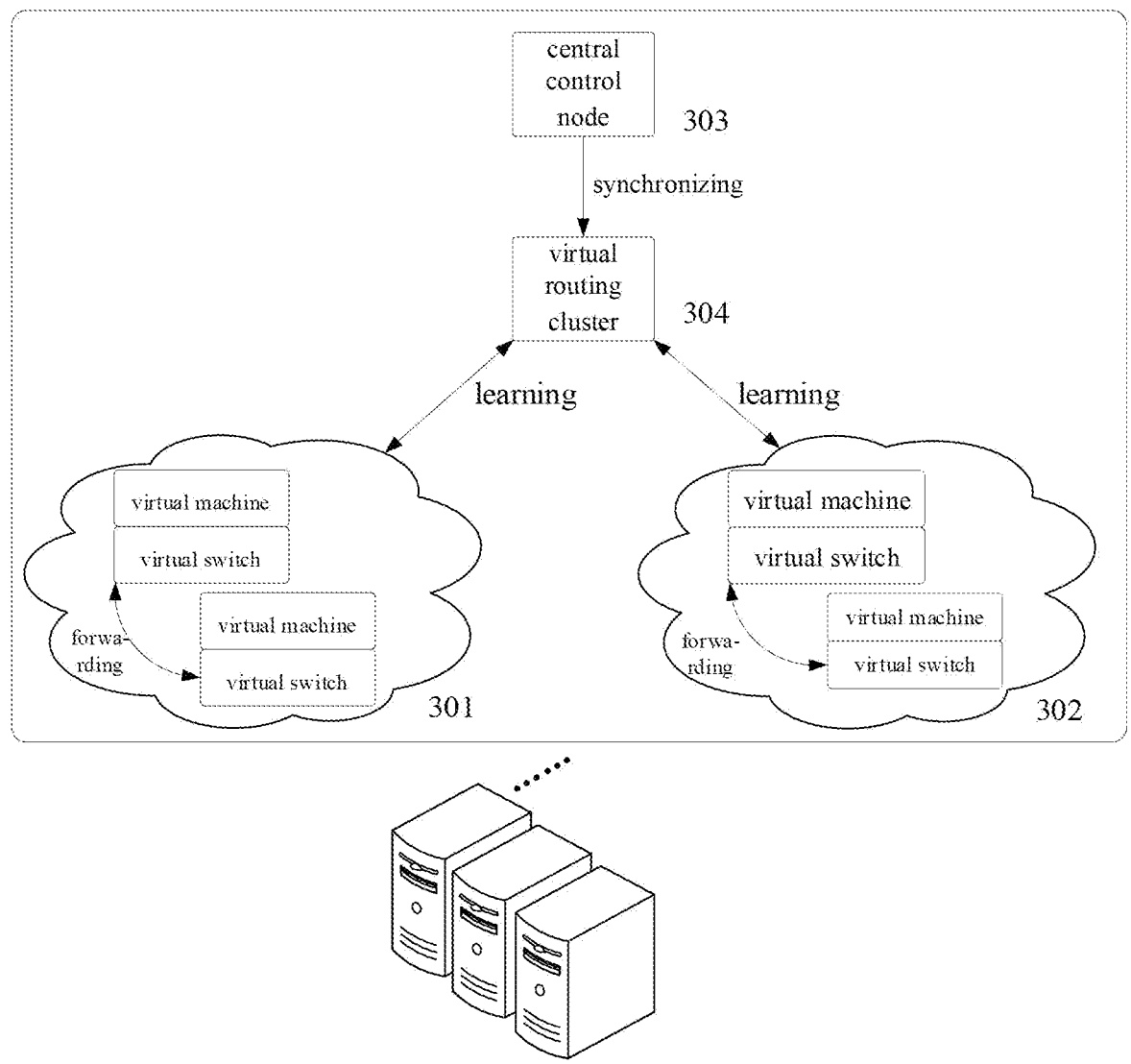
FIG. 3 is a schematic diagram of an application scenario of the method for forwarding data in a virtual network according to the present embodiment.

With further reference to FIG. 3, FIG. 3 is a schematic diagram 300 of an application scenario of the method for forwarding data in a virtual network according to the present embodiment. In the application scenario of FIG. 3, a virtual network includes multiple virtual private cloud networks 301 and 302, a central control node 303 and a virtual routing cluster 304. Each virtual private cloud network includes multiple computing nodes, and each computing node includes a virtual machine and a corresponding virtual switch. First, the central control node determines all forwarding rules for nodes in the virtual private cloud networks, in a process of managing virtual private cloud networks; then, the virtual routing cluster synchronizes all the forwarding rules of the central control node, and determines target forwarding rules corresponding to each virtual private cloud network from all the forwarding rules; further, for each virtual private cloud network of the multiple virtual private cloud networks, the virtual switch in the virtual private cloud network learns the target forwarding rules corresponding to the virtual private cloud network to which the virtual switch belongs, and data forwarding is performed based on the learned target forwarding rules.

In the present embodiment, a method for forwarding data in a virtual network is provided, where the central control node is responsible for managing the virtual private cloud networks, and determining all the forwarding rules for nodes in the virtual private cloud networks; the virtual routing cluster is responsible for synchronizing all the forwarding rules, and determining the target forwarding rules corresponding to each virtual private cloud network from all the forwarding rules, so that the virtual switch in each virtual private cloud network learns the corresponding forwarding rules and performs data forwarding. The central control node, the virtual routing cluster, and the virtual switches in the virtual private cloud networks perform their respective functions, which improves the timeliness of synchronizing forwarding rules, as well as the network transmission performance and stability of the virtual network.

In some alternative implementations of the present embodiment, the executing body may determine the target forwarding rules corresponding to each virtual private cloud network from all the forwarding rules by: in a process of synchronizing all the forwarding rules by the virtual routing cluster, determining, for each virtual private cloud network, version numbers of target forwarding rules corresponding to the virtual private cloud network in a preset incremental method.

In this implementation, each virtual private cloud network has an independent version number. At the beginning, in the virtual routing cluster, a version number of each virtual private cloud network for target forwarding rules is 0. During the forwarding rule synchronization, each time the forwarding rule synchronization is performed, the version number increases by a preset value in a data increment method. Forwarding rules for each forwarding rule synchronization correspond to a version number.

As an example, for each virtual private cloud network, the executing body may synchronize the target forwarding rules corresponding to the virtual private cloud network successively in chronological order of the target forwarding rules corresponding to the virtual private cloud network, and determine a version number corresponding to the learned forwarding rules according to the version numbers increased in the incremental method.

In this implementation, the executing body may, through the virtual switch in each virtual private cloud network, learn the target forwarding rules corresponding to the virtual private cloud network to which the virtual switch belongs by: for the virtual switch in each virtual private cloud network, synchronizing, based on the local version number of synchronized forwarding rules in the virtual switch and the version number of the target forwarding rules corresponding to the virtual private cloud network to which the virtual switch belongs, the unsynchronized target forwarding rule that has not been synchronized in the virtual switch and corresponds to the virtual private cloud network to which the virtual switch belongs.

Figure 4:
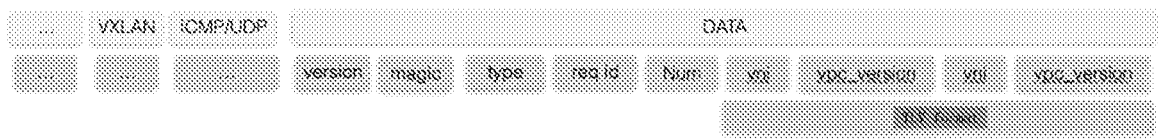
FIG. 4 is a schematic diagram of a data structure of a synchronization request according to the present disclosure.

As an example, in a real-time synchronization process, a virtual switch in a computing node sends a synchronization request (synchronization message) in real time. As shown in FIG. 4, a schematic diagram of a data structure of a synchronization request is shown. A synchronization request 400 mainly includes a protocol version number version, a magic character magic, a protocol type type, a request identity number Req_id, a VXLAN network identifier vni, and a local version number vpc_version for forwarding rules having been learned by the virtual switch. Requests in batches for forwarding rules may be performed through multiple vpc_versions.

Figure 5:
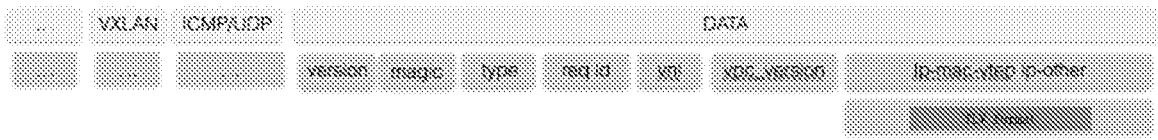
FIG. 5 is a schematic diagram of a data structure of synchronization response information according to the present disclosure.

In response to the synchronization request, the virtual routing cluster generates synchronization response information (a synchronization response message). As shown in FIG. 5, the synchronization response information 500 includes the protocol version number version, the magic character magic, the protocol type type, the request identity number Req_id, the VXLAN network identifier vni, a version number vpc_version of target forwarding rules to be learned by the virtual switch next time, an IP address, a MAC (Media Access Control) address, a VTEP IP address. Specifically, the virtual routing cluster may return forwarding rules that are adjusted in several adjustments after the virtual switch having learned the forwarding rules with the version number vpc_version, and a vpc_version value to be synchronized next time.

Figure 6:
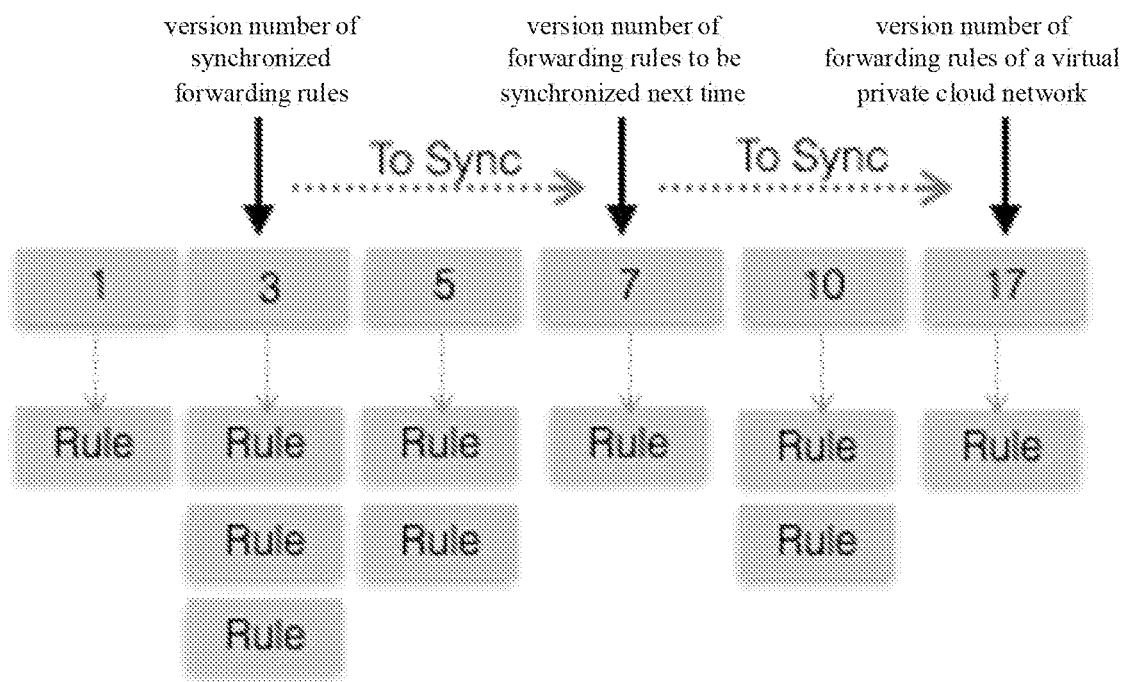
FIG. 6 is a schematic diagram of synchronization of forwarding rules based on a version number according to the present disclosure.

As shown in FIG. 6, a schematic diagram 600 of synchronizing forwarding rules based on a version number is shown. A version number of the synchronized forwarding rules in a virtual switch is 3, a version number of forwarding rules of the virtual private cloud network to which the virtual switch belongs in the virtual router cluster is 17, and a version number of forwarding rules to be synchronized in the virtual switch next time is 7. The version number of the forwarding rules of the virtual private cloud network to which the virtual switch belongs may be gradually synchronized in the virtual switch by performing multiple synchronization operations. The virtual switch may parse the synchronization response information to synchronize the forwarding rules and update the version number of the synchronized forwarding rules. If the synchronization fails, the local version number of the virtual switch before synchronization is used to synchronize the forwarding rules with the virtual routing cluster.

It may be understood that, when a corresponding version number in the virtual switch is different from the version number corresponding to the virtual private cloud network to which the virtual switch belongs in the virtual routing cluster, it indicates that there is an unsynchronized forwarding rule in the virtual routing cluster that has not been synchronized in the virtual switch, and the virtual switch needs to perform a synchronization operation. When the version number in the virtual switch and that in the virtual routing cluster are identical, it indicates that the forwarding rules in the virtual switch and those in the virtual routing cluster are completely synchronized.

In this implementation, in the process of synchronizing all the forwarding rules, the virtual routing cluster may determine the version numbers for target forwarding rules corresponding to each virtual private cloud network in a preset incremental method, where the version numbers of respective virtual private cloud networks are independent of each other; further, the virtual switch learns the forwarding rules through the local version number and the version numbers for the forwarding rules corresponding to the virtual private cloud network to which the virtual switch belongs in the virtual routing cluster, which improves an accuracy and efficiency of learning the forwarding rules.

In some alternative implementations of the present embodiment, before performing the above synchronization learning process, for each virtual switch, the executing body may perform synchronization and learning trigger operations as follows:

first, for a virtual switch with an initial version number in a virtual private cloud network, sending, in response to a source node determining that the virtual switch does not include a forwarding rule between the source node and a target node in a data forwarding process through the virtual switch, a data message having a learning attribute to the virtual routing cluster.

The initial version number of the virtual switch is 0. When the version number corresponding to the virtual switch is 0, synchronization and learning of forwarding rules is not performed. When receiving access data from the source node to the target node, and the virtual switch does not include the forwarding rule between the source node and the target node, the virtual switch sends the data message having a learning attribute to the virtual routing cluster.

That is, the data message has two attributes: a general message attribute that requests the virtual routing cluster to perform data forwarding and the learning message attribute that indicates to perform learning of the forwarding rules from the virtual routing cluster.

Secondly, determining, through the virtual routing cluster, a forwarding rule represented by a network identifier of a virtual private cloud network corresponding to the data message and an Internet protocol address of the target node, and forwarding the data message to the target node according to the determined forwarding rule.

The network identifier of the virtual private cloud network is VNI. Since the virtual switch does not include the forwarding rule between the source node and the target node, that is, in a first stream of the access data before the virtual switch learns the forwarding rule between the source node and the target node, the first stream is forwarded through the virtual routing cluster.

Thirdly, generating a response message corresponding to the data message, according to the determined forwarding rule and the version number of the target forwarding rules corresponding to the virtual private cloud network to which the virtual switch belongs.

Figure 7:
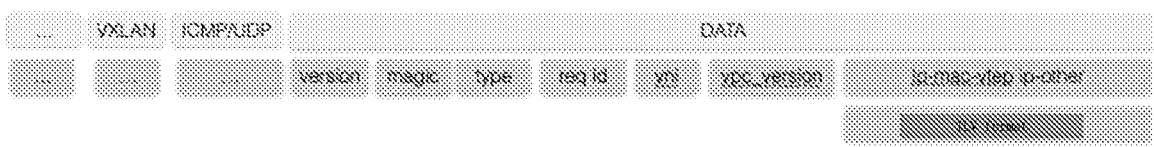
FIG. 7 is a schematic structural diagram of a learning message according to the present disclosure.

As shown in FIG. 7, a schematic diagram of data of a learning response message is shown, which mainly includes information such as the protocol version number version, the magic character magic, the protocol type type, the request identity number Req_id, the VXLAN network identifier vni, the local version number vpc_version corresponding to forwarding rules having been learned by the virtual switch, the IP address, the MAC address, the VTEP IP address, and the like. A data structure of the learning response message may be identical with the data structure of the synchronization response information as shown in FIG. 5.

Fourth, sending the response message to the virtual switch to learn the target forwarding rules corresponding to the virtual private cloud network to which the virtual switch belongs, and updating the initial version number to a version number corresponding to the learned and synchronized forwarding rule.

As an example, when the version number corresponding to the learned and synchronized forwarding rule is 3, the initial version number is updated to 3. If the version number of the virtual switch is not 0, the above real-time synchronization process of the forwarding rules may be performed.

Figure 8:
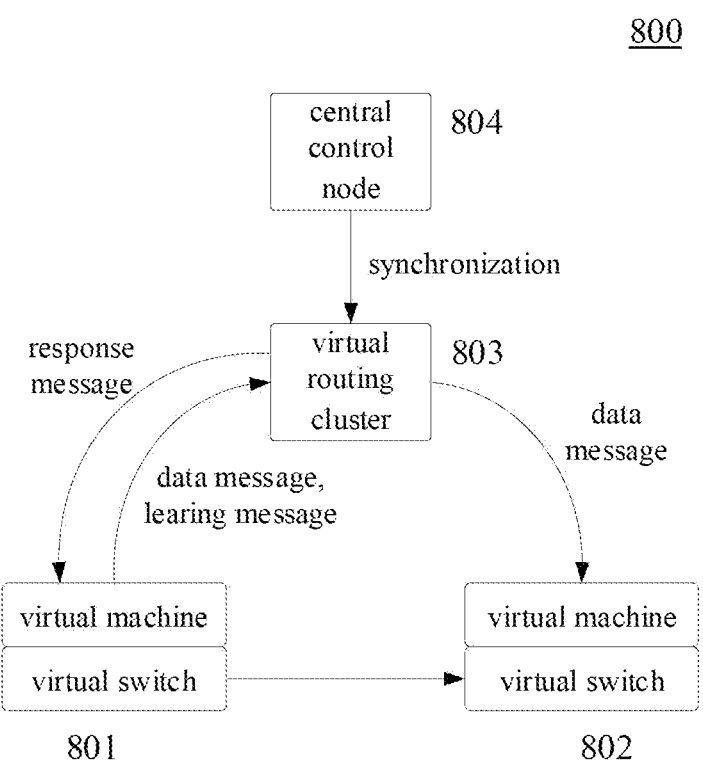
FIG. 8 is a schematic diagram of data forwarding between computing nodes in a virtual network according to the present disclosure.

Referring to FIG. 8, a schematic diagram of data forwarding for computing nodes in a virtual network is shown. When a virtual switch in a computing node 801 needs to access a computing node 802, because a corresponding forwarding rule between the computing node 802 and the computing node 801 is missing, a first stream of data message is forwarded to a virtual routing cluster 803 by default. Moreover, a specific learning identifier is marked at a VXLAN head of the data message, indicating that the data message has a learning message attribute. That is, the message has two attributes: a general message attribute and a learning message attribute.

The virtual routing cluster receives a corresponding data message, retrieves a forwarding rule based on an inner layer VNI of the VXLAN and a target IP of the inner layer, and forwards the data message to a virtual switch in the computing node 802 according to the retrieved forwarding rule. The forwarding rules in the virtual routing cluster are obtained through performing synchronization by a central control node 804. At the same time, in the forwarding process, the virtual routing cluster identifies the learning identifier of the data message, generates a response message based on the retrieved forwarding rule and a current version number of the corresponding virtual private cloud network, and returns the response message to the computing node 801.

The computing node 801 identifies the response message and, based on the forwarding rule therein, updates a forwarding rule table of the virtual switch in the computing node 801 to guide forwarding of a data message of a subsequent stream. Specifically, traffic data before learning the retrieved forwarding rule between the computing nodes 801 and 802 may continuously be forwarded through the virtual routing cluster; subsequent traffic data after learning the retrieved forwarding rule between the computing nodes 801 and 802, data forwarding between the computing nodes 801 and 802 may be performed in a pass-through mode, without going through the virtual routing cluster.

Figure 9:
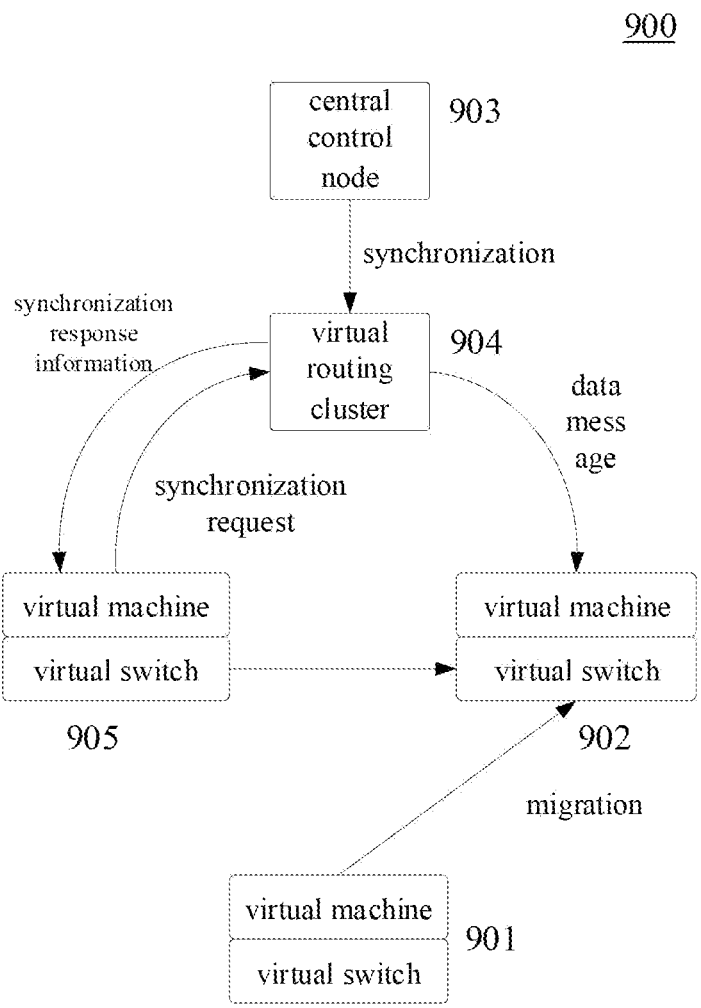
FIG. 9 is a schematic diagram of data forwarding in a virtual machine migration scenario according to the present disclosure.

With further reference to FIG. 9, a schematic diagram of data forwarding in a virtual machine migration scenario is shown. When a virtual machine in a computing node 901 is migrated to a computing node 902, a central control node 903 synchronizes a changed forwarding rule in a virtual routing cluster 904. Due to a real-time synchronization mechanism being available between a computing node 905 and the virtual routing cluster, a virtual switch in the computing node 905 sends a forwarding rule synchronization request to the virtual routing cluster in real time. In response to the forwarding rule synchronization request, the virtual routing cluster generates synchronization response information based on the changed forwarding rule and a corresponding version number, and sends the synchronization response information to the computing node 905 for performing forwarding rule synchronization.

In this implementation, in an initial stage where a version number corresponding to the virtual switch is 0, synchronization and learning of forwarding rules is not performed until the virtual switch receives a forwarding task. A learning process of a forwarding rule is triggered through a learning message, which improves the timeliness and effectiveness of rule learning.

In some alternative implementations of the present embodiment, the executing body may perform data forwarding based on the learned target forwarding rules by: for a virtual switch in a virtual private cloud network, in response to determining that the virtual switch has learned a forwarding rule between a source node and a target node, performing data forwarding between the source node and the target node in a direct-forwarding mode based on the learned forwarding rule.

When the virtual switch receives to-be-forwarded data between the source node and the target node, and has learned the forwarding rule between the source node and the target node, the virtual switch may directly forward the to-be-forwarded data from the source node to the target node. In this implementation, data forwarding between the source node and the target node is performed in the direct-forwarding mode, which improves the network transmission performance of the virtual network.

In some alternative implementations of the present embodiment, the executing body may further perform the following operation: for a virtual switch in a virtual private cloud network, in response to determining that the virtual switch has not learned a forwarding rule between a source node and a target node, performing data forwarding between the source node and the target node through the virtual routing cluster.

In this implementation, for to-be-forwarded data between the source node and the target node corresponding to a forwarding rule that has not been learned, the virtual machine forwards the corresponding to-be-forwarded data by means of the virtual routing cluster, which improves a completeness of the virtual network.

In some alternative implementations of the present embodiment, the executing body may further perform the following operation: for synchronized forwarding rules in a virtual switch, in response to determining that the number of the synchronized forwarding rules exceeds a preset number threshold, deleting a forwarding rule with a cache duration exceeding a preset duration threshold.

Here, the preset number threshold and the preset duration threshold may be set according to actual situations, which are not limited here.

For example, when the number of learned forwarding rules in the virtual switch exceeds 500,000, a forwarding rule with a cache duration exceeding 5 days is deleted.

For a data forwarding task between the source node and the target node corresponding to the deleted forwarding rule, data forwarding is performed by means of the virtual routing cluster.

In this implementation, in response to determining that the number of the synchronized forwarding rules exceeds the preset number threshold, the forwarding rule with the cache duration exceeding the preset duration threshold is deleted, which improves a memory controllability of the virtual switch, and based on the controllable memory, an updated forwarding rule may be learned, which helps to improve a flexibility and practicality of a forwarding rule learning process.

In some alternative implementations of the present embodiment, the executing body may further perform the following operation: for the virtual switch in each virtual private cloud network, in response to determining that version numbers of the target forwarding rules in the virtual routing cluster that have been synchronized and correspond to the virtual private cloud network to which the virtual switch belongs do not include a local version number of the synchronized forwarding rules in the virtual switch, instructing the virtual switch to relearn the target forwarding rules corresponding to the virtual private cloud network to which the virtual switch belongs from the initial version number.

As an example, the virtual routing cluster determines the version numbers of the forwarding rules corresponding to the virtual private cloud network based on an incremental method in which the version numbers are increased by an interval value, e.g., 1, 3, 5. However, if the version number of the forwarding rules having been synchronized in the virtual switch is 4, it may be determined that the version number of the forwarding rules corresponding to the virtual private cloud network in the virtual routing cluster does not match the version number of the forwarding rules having been synchronized in the virtual switch, indicating that there is an error in the synchronization and learning process of the virtual switch for the forwarding rules, the learned forwarding rules in the virtual switch need to be emptied, and it is necessary to instruct the virtual switch to relearn the target forwarding rules corresponding to the virtual private cloud network to which the virtual switch belongs from the initial version number.

In this implementation, by matching the version number corresponding to the virtual routing cluster and the corresponding version number in the virtual switch, an accuracy of synchronization and learning for forwarding rules by the virtual switch may be determined, and in the case of a mismatch, the virtual switch is instructed to restart the synchronization and learning process of the forwarding rules, which improves the accuracy of the learning process of the forwarding rules and the stability of the virtual network.

Figure 10:
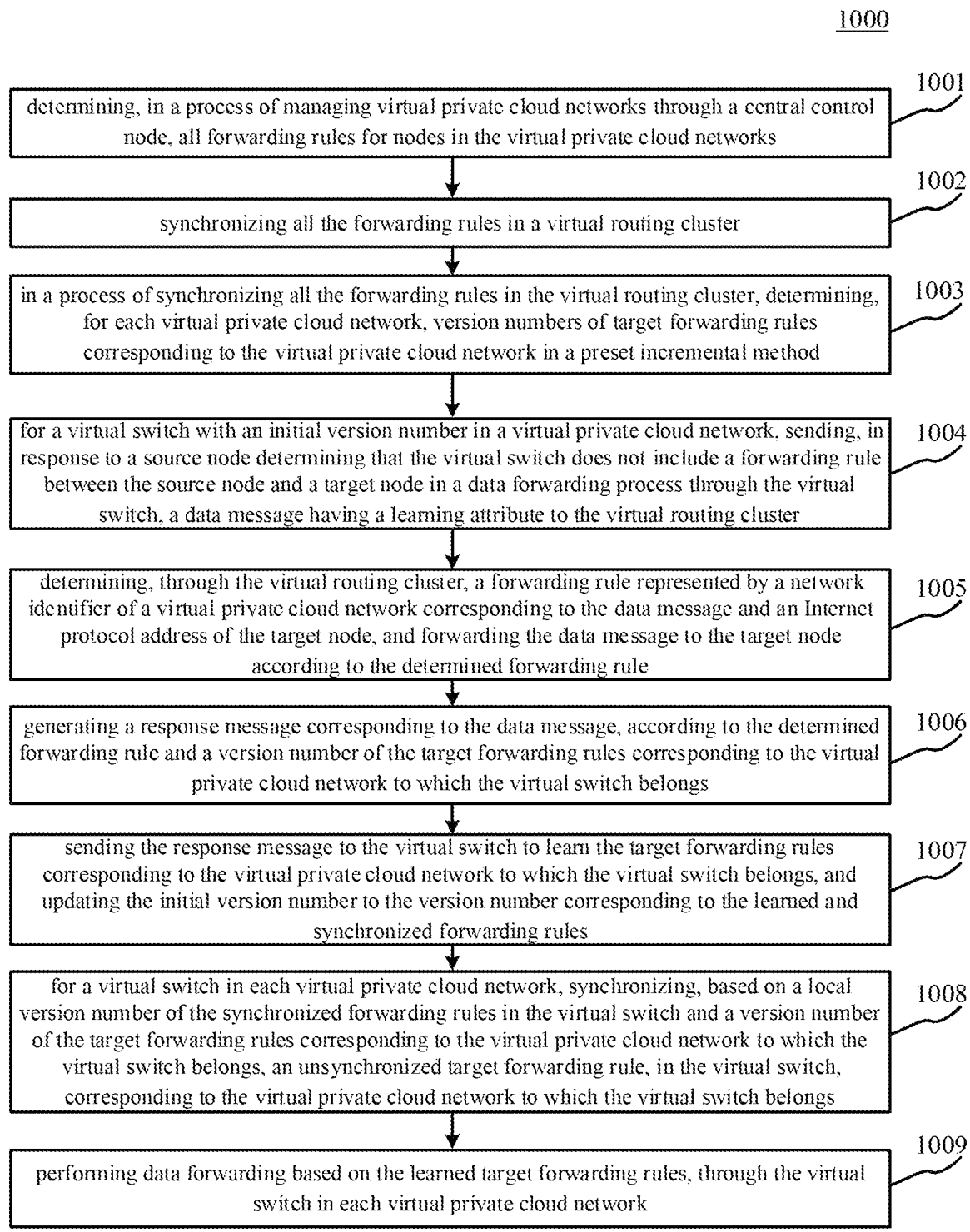
FIG. 10 is a flowchart of another embodiment of the method for forwarding data in a virtual network according to the present disclosure.

With further reference to FIG. 10, a schematic flow 1000 of another embodiment of the method for forwarding data in a virtual network according to the present disclosure is shown, including the following step 1001 to step 1009.

Step 1001, determining, in a process of managing virtual private cloud networks through a central control node, all forwarding rules for nodes in the virtual private cloud networks.

Step 1002, synchronizing all the forwarding rules in a virtual routing cluster.

Step 1003, in a process of synchronizing all the forwarding rules in the virtual routing cluster, determining, for each virtual private cloud network, version numbers of target forwarding rules corresponding to the virtual private cloud network in a preset incremental method.

Step 1004, for a virtual switch with an initial version number in a virtual private cloud network, sending, in response to a source node determining that the virtual switch does not include a forwarding rule between the source node and a target node in a data forwarding process through the virtual switch, a data message having a learning attribute to the virtual routing cluster.

Step 1005, determining, through the virtual routing cluster, a forwarding rule represented by a network identifier of a virtual private cloud network corresponding to the data message and an Internet protocol address of the target node, and forwarding the data message to the target node according to the determined forwarding rule.

Step 1006, generating a response message corresponding to the data message, according to the determined forwarding rule and a version number of the target forwarding rules corresponding to the virtual private cloud network to which the virtual switch belongs.

Step 1007, sending the response message to the virtual switch to learn the target forwarding rules corresponding to the virtual private cloud network to which the virtual switch belongs, and updating the initial version number to the version number corresponding to the learned and synchronized forwarding rules.

Step 1008, for a virtual switch in each virtual private cloud network, synchronizing, based on a local version number of the synchronized forwarding rules in the virtual switch and a version number of the target forwarding rules corresponding to the virtual private cloud network to which the virtual switch belongs, an unsynchronized target forwarding rule, in the virtual switch, corresponding to the virtual private cloud network to which the virtual switch belongs.

Step 1009, performing data forwarding based on the learned target forwarding rules, through the virtual switch in each virtual private cloud network.

As can be seen from the present embodiment, compared with the corresponding embodiment in FIG. 2, the flow 1000 of the method for forwarding data in a virtual network in the present embodiment describes the learning process of forwarding rules based on the version number in details, further improving the timeliness of synchronizing forwarding rules, as well as the network transmission performance and stability of the virtual network.

Figure 11:
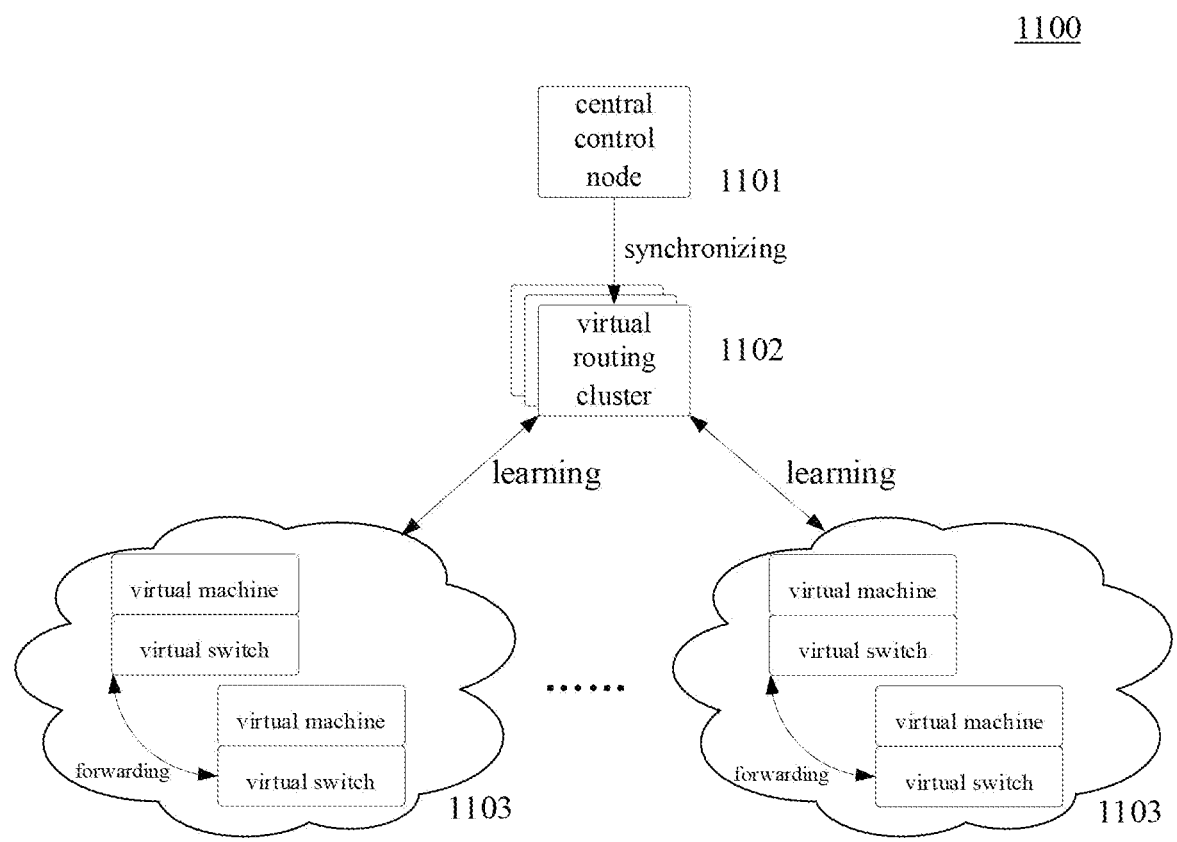
FIG. 11 is a structural diagram of an embodiment of a system for forwarding data in a virtual network according to the present disclosure.

With further reference to FIG. 11, a schematic structural diagram of a system for forwarding data in a virtual network according to the present disclosure is shown, where a system 1100 for forwarding data includes:

a central control node 1101, configured to determine, in a process of managing virtual private cloud networks, all forwarding rules for nodes in the virtual private cloud networks; a virtual routing cluster 1102, configured to synchronize all the forwarding rules, and determine target forwarding rules corresponding to each virtual private cloud network from all the forwarding rules; and multiple virtual private cloud networks 1103, configured to, through a virtual switch in each virtual private cloud network, learn the target forwarding rules corresponding to the virtual private cloud network to which the virtual switch belongs, and perform data forwarding based on the learned target forwarding rules.

In some alternative implementations of the present embodiment, the virtual routing cluster 1102 is further configured to: in the process of synchronizing all the forwarding rules, determine, for each virtual private cloud network, version numbers of the target forwarding rules corresponding to the virtual private cloud network in a preset incremental method; and the multiple virtual private cloud networks 1103, are further configured to: for the virtual switch in each virtual private cloud network, synchronize, based on a local version number of the synchronized forwarding rules in the virtual switch and a version number of the target forwarding rules corresponding to the virtual private cloud network to which the virtual switch belongs, an unsynchronized target forwarding rule corresponding to the virtual private cloud network to which the virtual switch belongs.

In some alternative implementations of the present embodiment, the multiple virtual private cloud networks 1103 are further configured to: for a virtual switch with an initial version number in each virtual private cloud network, send, in response to a source node determining that the virtual switch does not comprise a forwarding rule between the source node and a target node in a data forwarding process through the virtual switch, a data message having a learning attribute to the virtual routing cluster; and the virtual routing cluster 1102 is further configured to: determine a forwarding rule represented by a network identifier of a virtual private cloud network corresponding to the data message and an Internet protocol address of the target node, and forward the data message to the target node according to the determined forwarding rule; generate a response message corresponding to the data message, according to the determined forwarding rule and the version number of the target forwarding rules corresponding to the virtual private cloud network to which the virtual switch belongs; and send the response message to the virtual switch to learn the target forwarding rules corresponding to the virtual private cloud network to which the virtual switch belongs, and update the initial version number to the version number corresponding to the learned and synchronized forwarding rule.

In some alternative implementations of the present embodiment, the multiple virtual private cloud networks 1103 are further configured to: for a virtual switch in the virtual private cloud networks, in response to determining that the virtual switch has learned a forwarding rule between a source node and a target node, perform data forwarding between the source node and the target node in a direct-forwarding mode based on the learned forwarding rule.

In some alternative implementations of the present embodiment, the multiple virtual private cloud networks 1103 are further configured to: for a virtual switch in the virtual private cloud networks, in response to determining that the virtual switch has not learned the forwarding rule between the source node and the target node, perform data forwarding between the source node and the target node through the virtual routing cluster.

In some alternative implementations of the present embodiment, the multiple virtual private cloud networks 1103 are further configured to: in response to determining that the number of synchronized forwarding rules in a virtual switch exceeds a preset number threshold, delete a forwarding rule with a cache duration exceeding a preset duration threshold.

In some alternative implementations of the present embodiment, the virtual routing cluster 1102 is further configured to: for the virtual switch in each virtual private cloud network, in response to determining that version numbers of the target forwarding rules that have been synchronized in the virtual routing cluster and correspond to the virtual private cloud network to which the virtual switch belongs do not include the local version number of the synchronized forwarding rule in the virtual switch, instruct the virtual switch to relearn the target forwarding rule corresponding to the virtual private cloud network to which the virtual switch belongs from the initial version number.

In the present embodiment, a system for forwarding data in a virtual network is provided, and a central control node is responsible for managing virtual private cloud networks, and determining a full forwarding rule between nodes in the virtual private cloud networks; a virtual routing cluster is responsible for synchronizing the full forwarding rule, and determining target forwarding rules corresponding to the virtual private cloud networks from the full forwarding rule, so that virtual switches in the virtual private cloud networks learn the corresponding forwarding rules and perform data forwarding. The central control node, the virtual routing cluster, and the virtual switches in the virtual private cloud networks perform their respective functions, which improves the timeliness of synchronizing forwarding rules, as well as the network transmission performance and stability of the virtual network.

Figure 12:
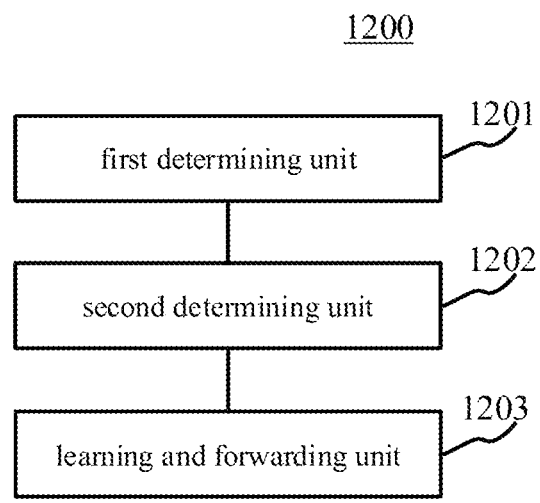
FIG. 12 is a structural diagram of an embodiment of an apparatus for forwarding data in a virtual network according to the present disclosure.

With further reference to FIG. 12, as an implementation of the method shown in the above figures, the present disclosure provides an embodiment of an apparatus for forwarding data in a virtual network, and the apparatus embodiment corresponds to the method embodiment as shown in FIG. 2. The apparatus embodiment corresponds to the method embodiment shown in FIG. 2, and the apparatus may be specifically applied to various electronic devices.

As shown in FIG. 12, the apparatus for forwarding data in a virtual network includes: a first determining unit 1201, configured to determine, in a process of managing virtual private cloud networks through a central control node, all forwarding rules for nodes in the virtual private cloud networks; a second determining unit 1202, configured to synchronize the forwarding rules in a virtual routing cluster, and determine target forwarding rules corresponding to each virtual private cloud network from the forwarding rules; and a learning and forwarding unit 1203, configured to, through a virtual switch in each virtual private cloud network, learn the target forwarding rules corresponding to the virtual private cloud network to which the virtual switch belongs, and perform data forwarding based on the learned target forwarding rules.

In some alternative implementations of the present embodiment, the second determining unit 1202 is further configured to: in a process of synchronizing the forwarding rules, determine, for each virtual private cloud network, version numbers of the target forwarding rules corresponding to the virtual private cloud network in a preset incremental method; and the learning and forwarding unit 1203 is further configured to: for the virtual switches in each virtual private cloud network, synchronize, based on a local version number of synchronized forwarding rules in the virtual switch and a version number of the target forwarding rules corresponding to the virtual private cloud network to which the virtual switch belongs, an unsynchronized target forwarding rule that has not been synchronized in the virtual switch and corresponds to the virtual private cloud network to which the virtual switch belongs.

In some alternative implementations of the present embodiment, the learning and forwarding unit 1203 is further configured to: for a virtual switch with an initial version number in each virtual private cloud network, send, in response to a source node determining that the virtual switch does not comprise a forwarding rule between the source node and a target node in a data forwarding process through the virtual switch, a data message having a learning attribute to the virtual routing cluster; determine a forwarding rule represented by a network identifier of a virtual private cloud network corresponding to the data message and an Internet protocol address of the target node, and forward the data message to the target node according to the determined forwarding rule; generate a response message corresponding to the data message, according to the determined forwarding rule and version numbers of the target forwarding rules corresponding to the virtual private cloud network to which the virtual switch belongs; and send the response message to the virtual switch to learn the target forwarding rules corresponding to the virtual private cloud network to which the virtual switch belongs, and update the initial version number to a version number corresponding to the learned and synchronized forwarding rules.

In some alternative implementations of the present embodiment, the learning and forwarding unit 1203 is further configured to: for the virtual switch in each virtual private cloud network, in response to determining that the virtual switch has learned a forwarding rule between a source node and a target node, perform data forwarding between the source node and the target node in a direct-forwarding mode based on the learned forwarding rule between the source node and the target node.

In some alternative implementations of the present embodiment, the apparatus further includes: a forwarding unit (not shown in the figure), configured to: for the virtual switch in each virtual private cloud network, in response to determining that the virtual switch has not learned the forwarding rule between the source node and the target node, perform data forwarding between the source node and the target node through the virtual routing cluster.

In some alternative implementations of the present embodiment, the apparatus further includes: a deleting unit (not shown in the figure), configured to: in response to determining that a number of synchronized forwarding rules in the virtual switch exceeds a preset number threshold, delete a forwarding rule with a cache duration exceeding a preset duration threshold.

In some alternative implementations of the present embodiment, the apparatus further includes: an instructing unit (not shown in the figure), configured to: for the virtual switch in each virtual private cloud network, in response to determining that the version numbers of the target forwarding rules that have been synchronized in the virtual routing cluster and correspond to the virtual private cloud network to which the virtual switch belongs synchronized in the virtual routing cluster do not comprise the local version number of the synchronized forwarding rules in the virtual switch, instruct the virtual switch to relearn the target forwarding rule corresponding to the virtual private cloud network to which the virtual switch belongs from the initial version number.

In the present embodiment, an apparatus for forwarding data in a virtual network is provided, where a central control node is responsible for managing virtual private cloud networks, and determining all forwarding rules for nodes in the virtual private cloud networks; a virtual routing cluster is responsible for synchronizing all the forwarding rules, and determines target forwarding rules corresponding to each virtual private cloud network from all the forwarding rules, so that a virtual switch in the virtual private cloud network learns corresponding forwarding rules and performs data forwarding. The central control node, the virtual routing cluster, and the virtual switches in the virtual private cloud networks perform their respective functions, which improves timeliness of synchronizing forwarding rules, as well as a network transmission performance and stability of the virtual network.

According to an embodiment of the present disclosure, the present disclosure also provides an electronic device, and the electronic device includes: at least one processor; and a memory communicatively connected to the at least one processor; where, the memory stores instructions executable by the at least one processor, and the instructions, when executed by the at least one processor, cause the at least one processor to implement the method for forwarding data in a virtual network described in any of the above embodiments.

According to an embodiment of the present disclosure, the present disclosure also provides a readable storage medium, and the readable storage medium stores computer instructions, where, the computer instructions are used to cause the computer to implement the method for forwarding data in a virtual network described in any of the above embodiments.

An embodiment of the present disclosure provides a computer program product, including a computer program, the computer program, when executed by a processor, implements the method for forwarding data in a virtual network described in any of the above embodiments.

Figure 13:
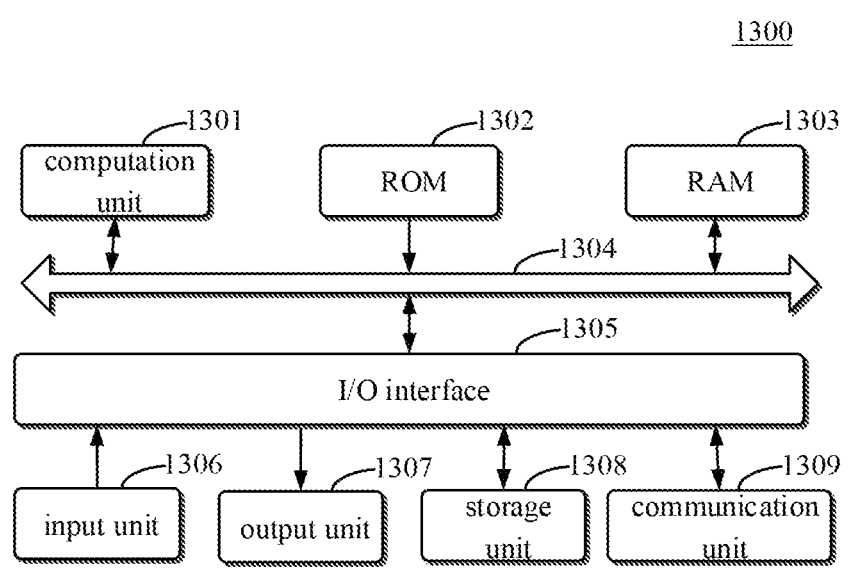
FIG. 13 is a schematic structural diagram of a computer system suitable for implementing embodiments of the present disclosure.

FIG. 13 shows a schematic block diagram of an example electronic device 1300 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 13, the device 1300 includes a computation unit 1301, which may perform various appropriate actions and processing, based on a computer program stored in a read-only memory (ROM) 1302 or a computer program loaded from a storage unit 1308 into a random access memory (RAM) 1303. In the RAM 1303, various programs and data required for the operation of the device 1300 may also be stored. The computation unit 1301, the ROM 1302, and the RAM 1303 are connected to each other through a bus 1304. An input/output (I/O) interface 1305 is also connected to the bus 1304.

A plurality of parts in the device 1300 are connected to the I/O interface 1305, including: an input unit 1306, for example, a keyboard and a mouse; an output unit 1307, for example, various types of displays and speakers; the storage unit 1308, for example, a disk and an optical disk; and a communication unit 1309, for example, a network card, a modem, or a wireless communication transceiver. The communication unit 1309 allows the device 1300 to exchange information/data with other devices over a computer network such as the Internet and/or various telecommunication networks.

The computation unit 1301 may be various general-purpose and/or dedicated processing components having processing and computing capabilities. Some examples of the computation unit 1301 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 1301 performs the various methods and processes described above, such as a method for forwarding data in a virtual network. For example, in some embodiments, the method for forwarding data in a virtual network may be implemented as a computer software program, which is tangibly included in a machine readable medium, such as the storage unit 1308. In some embodiments, part or all of the computer program may be loaded and/or installed on the device 1300 via the ROM 1302 and/or the communication unit 1309. When the computer program is loaded into the RAM 1303 and executed by the computation unit 1301, one or more steps of the method for forwarding data in a virtual network described above may be performed. Alternatively, in other embodiments, the computation unit 1301 may be configured to perform the method for forwarding data in a virtual network by any other appropriate means (for example, by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, is also known as a cloud computing server or a cloud host, and is a host product in a cloud computing service system to solve the defects of difficult management and weak service extendibility existing in conventional physical hosts and virtual private servers (VPS).

According to the technical solution of the embodiments of the present disclosure, a method for forwarding data in a virtual network is provided, where a central control node is responsible for managing virtual private cloud networks, and determining all forwarding rules for nodes in the virtual private cloud networks; a virtual routing cluster is responsible for synchronizing all the forwarding rules, and determines target forwarding rules corresponding to each virtual private cloud network from all the forwarding rules, so that a virtual switch in the virtual private cloud network learns corresponding forwarding rules and performs data forwarding. The central control node, the virtual routing cluster, and the virtual switches in the virtual private cloud networks perform their respective functions, which improves timeliness of synchronizing forwarding rules, as well as a network transmission performance and stability of the virtual network.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for forwarding data in a virtual network, the method comprising:
   determining, in a process of managing virtual private cloud networks through a central control node, forwarding rules for nodes in the virtual private cloud networks, wherein each virtual private cloud network comprises a plurality of nodes, and each node comprises a virtual switch;
   synchronizing the forwarding rules to virtual routers in a virtual routing cluster, and determining target forwarding rules corresponding to a virtual private cloud network from the forwarding rules; and
   learning, by a virtual switch in the virtual private cloud network, the target forwarding rules corresponding to the virtual private cloud network to which the virtual switch belongs, and performing data forwarding based on the learned target forwarding rules.

2. The method according to claim 1, wherein determining the target forwarding rules corresponding to the virtual private cloud network from the forwarding rules, comprises:
   in a process of synchronizing the forwarding rules to the virtual routers in the virtual routing cluster, determining, for each virtual private cloud network, version numbers of the target forwarding rules corresponding to the virtual private cloud network, wherein each time the synchronizing of the forwarding rules is performed, a current version number of the target forwarding rules corresponding to the virtual private cloud network is increased by a preset value; and
   learning, by the virtual switch in the virtual private cloud network, the target forwarding rules corresponding to the virtual private cloud network to which the virtual switch belongs, comprises:
   for the virtual switch in the virtual private cloud network, synchronizing, based on a local version number of synchronized forwarding rules in the virtual switch and a version number of the target forwarding rules corresponding to the virtual private cloud network to which the virtual switch belongs, an unsynchronized target forwarding rule that has not been synchronized in the virtual switch and corresponds to the virtual private cloud network to which the virtual switch belongs.

3. The method according to claim 2, wherein before synchronizing, for the virtual switch in the virtual private cloud network, based on the local version number of synchronized forwarding rules in the virtual switch and the version number of the target forwarding rules corresponding to the virtual private cloud network to which the virtual switch belongs, the unsynchronized target forwarding rule that has not been synchronized in the virtual switch and corresponds to the virtual private cloud network to which the virtual switch belongs, learning the target forwarding rules corresponding to the virtual private cloud network to which the virtual switch belongs through the virtual switch in the virtual private cloud network further comprises:
   for the virtual switch with an initial version number in the virtual private cloud network, sending, in response to a source node determining that the virtual switch does not comprise a forwarding rule between the source node and a target node in a data forwarding process through the virtual switch, a data message having a learning attribute to the virtual routing cluster;
   through the virtual routing cluster, determining a forwarding rule represented by a network identifier of the virtual private cloud network corresponding to the data message and an Internet protocol address of the target node, and forwarding the data message to the target node according to the determined forwarding rule;
   generating a response message corresponding to the data message, according to the determined forwarding rule and the version number of the target forwarding rules corresponding to the virtual private cloud network to which the virtual switch belongs; and
   sending the response message to the virtual switch to learn the target forwarding rules corresponding to the virtual private cloud network to which the virtual switch belongs, and updating the initial version number to a version number corresponding to the learned and synchronized forwarding rules.

4. The method according to claim 1, wherein performing data forwarding based on the learned target forwarding rules, comprises:
   for the virtual switch in the virtual private cloud network, in response to determining that the virtual switch has learned a forwarding rule between a source node and a target node, performing data forwarding between the source node and the target node in a direct-forwarding mode based on the learned forwarding rule between the source node and the target node.

5. The method according to claim 4, wherein the method further comprises:
   for the virtual switch in the virtual private cloud network, in response to determining that the virtual switch has not learned the forwarding rule between the source node and the target node, performing data forwarding between the source node and the target node through the virtual routing cluster.

6. The method according to claim 1, wherein the method further comprises:
   for synchronized forwarding rules in the virtual switch, in response to determining that a number of the synchronized forwarding rules exceeds a preset number threshold, deleting a forwarding rule with a cache duration exceeding a preset duration threshold.

7. The method according to claim 3, wherein the method further comprises:
for the virtual switch in the virtual private cloud network, in response to determining that the version numbers of the target forwarding rules that have been synchronized in the virtual routing cluster and correspond to the virtual private cloud network to which the virtual switch belongs do not comprise the local version number of the synchronized forwarding rules in the virtual switch, instructing the virtual switch to relearn the target forwarding rules corresponding to the virtual private cloud network to which the virtual switch belongs from the initial version number.

8. A system for forwarding data in a virtual network, the system comprising:
a central control node, configured to determine, in a process of managing virtual private cloud networks, forwarding rules for nodes in the virtual private cloud networks, wherein each virtual private cloud network comprises a plurality of nodes, and each node comprises a virtual switch;
a virtual routing cluster, configured to synchronize the forwarding rules to virtual routers in the virtual routing cluster, and determine target forwarding rules corresponding to a virtual private cloud network from the forwarding rules; and
a plurality of virtual private cloud networks, configured to learn, by a virtual switch in the virtual private cloud network, the target forwarding rules corresponding to the virtual private cloud network to which the virtual switch belongs, and perform data forwarding based on the learned target forwarding rules.

9. The system according to claim 8, wherein the virtual routing cluster is further configured to:
in a process of synchronizing the forwarding rules, determine, for each virtual private cloud network, version numbers of the target forwarding rules corresponding to the virtual private cloud network, wherein each time the synchronizing of the forwarding rules is performed, a current version number of the target forwarding rules corresponding to the virtual private cloud network is increased by a preset value; and
the plurality of virtual private cloud networks, are further configured to:
for the virtual switches in the virtual private cloud network, synchronize, based on a local version number of synchronized forwarding rules in the virtual switch and a version number of the target forwarding rules corresponding to the virtual private cloud network to which the virtual switch belongs, an unsynchronized target forwarding rule that has not been synchronized in the virtual switch and corresponds to the virtual private cloud network to which the virtual switch belongs.

10. The system according to claim 9, wherein the plurality of virtual private cloud networks are further configured to:
for the virtual switch with an initial version number in the virtual private cloud network, send, in response to a source node determining that the virtual switch does not comprise a forwarding rule between the source node and a target node in a data forwarding process through the virtual switch, a data message having a learning attribute to the virtual routing cluster; and
the virtual routing cluster is further configured to:
determine a forwarding rule represented by a network identifier of the virtual private cloud network corresponding to the data message and an Internet protocol address of the target node, and forward the data message to the target node according to the determined forwarding rule; generate a response message corresponding to the data message, according to the determined forwarding rule and version numbers of the target forwarding rules corresponding to the virtual private cloud network to which the virtual switch belongs; and send the response message to the virtual switch to learn the target forwarding rules corresponding to the virtual private cloud network to which the virtual switch belongs, and update the initial version number to a version number corresponding to the learned and synchronized forwarding rules.

11. The system according to claim 8, wherein the plurality of virtual private cloud networks are further configured to:
for the virtual switch in the virtual private cloud network, in response to determining that the virtual switch has learned a forwarding rule between a source node and a target node, perform data forwarding between the source node and the target node in a direct-forwarding mode based on the learned forwarding rule between the source node and the target node.

12. The system according to claim 11, wherein the plurality of virtual private cloud networks are further configured to:
for the virtual switch in the virtual private cloud network, in response to determining that the virtual switch has not learned the forwarding rule between the source node and the target node, perform data forwarding between the source node and the target node through the virtual routing cluster.

13. The system according to claim 8, wherein the plurality of virtual private cloud networks are further configured to:
in response to determining that a number of synchronized forwarding rules in the virtual switch exceeds a preset number threshold, delete a forwarding rule with a cache duration exceeding a preset duration threshold.

14. The system according to claim 10, wherein the virtual routing cluster is further configured to:
for the virtual switch in the virtual private cloud network, in response to determining that the version numbers of the target forwarding rules that have been synchronized in the virtual routing cluster and correspond to the virtual private cloud network to which the virtual switch belongs synchronized in the virtual routing cluster do not comprise the local version number of the synchronized forwarding rules in the virtual switch, instruct the virtual switch to relearn the target forwarding rule corresponding to the virtual private cloud network to which the virtual switch belongs from the initial version number.

15. An apparatus for forwarding data in a virtual network, the apparatus comprising:
at least one processor; and
a memory storing instructions, wherein the instructions when executed by the at least one processor, cause the at least one processor to perform operations, the operations comprising:
determining, in a process of managing virtual private cloud networks through a central control node, forwarding rules for nodes in the virtual private cloud networks, wherein each virtual private cloud network comprises a plurality of nodes, and each node comprises a virtual switch;
synchronizing the forwarding rules to virtual routers in a virtual routing cluster, and determining target forwarding rules corresponding to a virtual private cloud network from the forwarding rules; and learning, by a virtual switch in the virtual private cloud network, the target forwarding rules corresponding to the virtual private cloud network to which the virtual switch belongs, and performing data forwarding based on the learned target forwarding rules.

16. The apparatus according to claim 15, wherein determining the target forwarding rules corresponding to the virtual private cloud network from the forwarding rules, comprises:

in a process of synchronizing the forwarding rules to the virtual routers in the virtual routing cluster, determining, for each virtual private cloud network, version numbers of the target forwarding rules corresponding to the virtual private cloud network, wherein each time the synchronizing of the forwarding rules is performed, a current version number of the target forwarding rules corresponding to the virtual private cloud network is increased by a preset value; and learning, by the virtual switch in the virtual private cloud network, the target forwarding rules corresponding to the virtual private cloud network to which the virtual switch belongs, comprises:

for the virtual switch in the virtual private cloud network, synchronizing, based on a local version number of synchronized forwarding rules in the virtual switch and a version number of the target forwarding rules corresponding to the virtual private cloud network to which the virtual switch belongs, an unsynchronized target forwarding rule that has not been synchronized in the virtual switch and corresponds to the virtual private cloud network to which the virtual switch belongs.

17. The apparatus according to claim 16, wherein before synchronizing, for the virtual switch in the virtual private cloud network, based on the local version number of synchronized forwarding rules in the virtual switch and the version number of the target forwarding rules corresponding to the virtual private cloud network to which the virtual switch belongs, the unsynchronized target forwarding rule that has not been synchronized in the virtual switch and corresponds to the virtual private cloud network to which the virtual switch belongs, learning the target forwarding rules corresponding to the virtual private cloud network to which the virtual switch belongs through the virtual switch in the virtual private cloud network further comprises:

for the virtual switch with an initial version number in the virtual private cloud network, sending, in response to a source node determining that the virtual switch does not comprise a forwarding rule between the source node and a target node in a data forwarding process through the virtual switch, a data message having a learning attribute to the virtual routing cluster;

through the virtual routing cluster, determining a forwarding rule represented by a network identifier of the virtual private cloud network corresponding to the data message and an Internet protocol address of the target node, and forwarding the data message to the target node according to the determined forwarding rule;

generating a response message corresponding to the data message, according to the determined forwarding rule and the version number of the target forwarding rules corresponding to the virtual private cloud network to which the virtual switch belongs; and sending the response message to the virtual switch to learn the target forwarding rules corresponding to the virtual private cloud network to which the virtual switch belongs, and updating the initial version number to a version number corresponding to the learned and synchronized forwarding rules.

18. The apparatus according to claim 15, wherein performing data forwarding based on the learned target forwarding rules, comprises:

for the virtual switch in the virtual private cloud network, in response to determining that the virtual switch has learned a forwarding rule between a source node and a target node, performing data forwarding between the source node and the target node in a direct-forwarding mode based on the learned forwarding rule between the source node and the target node.

19. The apparatus according to claim 18, wherein the operations further comprise:

for the virtual switch in the virtual private cloud network, in response to determining that the virtual switch has not learned the forwarding rule between the source node and the target node, performing data forwarding between the source node and the target node through the virtual routing cluster.

20. The apparatus according to claim 15, wherein the operations further comprise: for synchronized forwarding rules in the virtual switch, in response to determining that a number of the synchronized forwarding rules exceeds a preset number threshold, deleting a forwarding rule with a cache duration exceeding a preset duration threshold.

* * * * *